United States Patent [19]

Coulombe

[11] 4,162,715
[45] Jul. 31, 1979

[54] AUTOMATIC RELEASING SEAT BELT

[76] Inventor: George Coulombe, 289 Tenby St., Coquitlam, Canada

[21] Appl. No.: 845,485

[22] Filed: Oct. 26, 1977

[51] Int. Cl.² .......................................... B60R 21/10
[52] U.S. Cl. ................................. 280/801; 24/230 A
[58] Field of Search ............ 180/82 C, 103 R, 103 A; 297/385; 24/230 R, 230 A, 230 AT; 244/122 B; 200/61.51; 280/744

[56] References Cited

U.S. PATENT DOCUMENTS

| 3,533,141 | 10/1970 | Uhai | 24/230 A |
|---|---|---|---|
| 3,537,088 | 10/1970 | Wells | 200/61.51 X |
| 3,770,919 | 11/1973 | Lewis | 180/82 C X |
| 3,896,426 | 7/1975 | Laurent | 200/61.51 X |
| 3,963,090 | 6/1976 | Hollins | 180/82 C |
| 4,081,052 | 3/1978 | Schärer | 180/82 C |

Primary Examiner—Joseph F. Peters, Jr.
Assistant Examiner—Michael Mar
Attorney, Agent, or Firm—Robert D. Farkas

[57] ABSTRACT

An automatic releasing seat belt utilizes a plate attached to a flexible belt portion of a seat belt. The plate is provided with a rectangular opening. A housing is attached to the other seat belt component having a compartment therein which is accessible by having a slot on one side and an opening on another side adjacent to the side of the slot. The plate is inserted in the slot such that the opening in the plate is disposed adjacent to the opening in the housing. Within the housing there is a camming plate utilizing a spring to bias upwardly and outwardly towards the opening in the housing a camming edge thereof. The camming edge engages one side of the opening in the plate. Thus, when the plate is inserted into the slot, the camming plate locks the plate into a given position. A flexible cable is disposed having one end engaged within the cavity of the housing and has a cam rod attached to the end of the inner cable portion thereof. When the inner cable is retracted, the cam rod is pulled toward the camming edge of the cam plate so as to dispose it downwardly, releasing the cam plate edge from the plate thereby disengaging same. The cam rod is activated by a solenoid coil, which in turn is sensitive to a plurality of sensors disposed about the interior portion of a motor vehicle, such sensors being responsive to an impact. Upon impact, the sensors operate a timer which disposes the solenoid into an activated condition releasing all of the belt mechanisms electrically coupled to it.

4 Claims, 7 Drawing Figures

AUTOMATIC RELEASING SEAT BELT

BACKGROUND OF THE INVENTION

1. The Field of the Invention

This invention relates to seat belt devices and more particularly to that class of apparatus which is automatically openable upon an impact suffered by the vehicle carrying the seat belt apparatus.

2. Description of the Prior Art

The prior art abounds with safety belt catches and operating devices. U.S. Pat. No. 3,494,664 issued Feb. 10, 1970 to John D. States teaches a latch or anchoring mechanism for an automobile safety belt having an anchoring structure located in the crease between the seat portion and back portion of a bench type seat, and a buckle portion fastened to the belt webbing and detachably connectable to the anchoring structure. The anchoring structure includes two bail members parallel to and spring pressed toward each other, but capable of moving laterally away from each other. The buckle portion has a main member with a pointed end and with square shoulders behind the pointed end. When the pointed end is pushed into the anchoring structure, it cams the bail members apart, and they snap behind the square shoulders on the main member, securing it against removal. A release slide on the main member has a cam portion which separates the anchoring bail members from each other when the release slide is moved longitudinally relative to the main member of the buckle portion, thus releasing the bail members from the square shoulders of the buckle portion and allowing the buckle portion to be withdrawn from the anchoring structure. The States apparatus requires manual engagement as well as manual disengagement of the coupling portions of the apparatus, thereby precluding the ability of a seriously injured person from being able to be released from a vehicle when such person is unconscience and unable to release himself from the belt apparatus.

German Pat. No. 2,401,441 issued July 17, 1975 to K. Metzger describes a separate emergency buckle for a safety belt that has an angled trap yoke attached at one end of the belt and with the yoke end suspended in a sliding member displaceable in a housing against the pressure of a spring and guided and fixed on the other end on a lower part, pivoting out sideways of the housing. There are roller with tensioning spring, and a windup roller with a gearwheel, in the sliding member. One roller runs over the holding band guided via the trap yoke, and a release lever engages the gearwheel and strikes with its other end against a pin fixed on the side toward the spring in the housing. The buckled belt automatically opens after a severe accident and releases the injured person. However, the release lever is activated only upon a given force operated on the spring controlling it hence, the weight of the injured person must be of a given magnitude to operate the release portion of the apparatus, or the impact must be of sufficient strength with an individual having a given weight to overcome the spring force. Hence, the Metz apparatus is totally unadjustable to accommodate for light impact for lightweight individuals utilizing the apparatus.

U.S. Pat. No. 3,362,748 issued on Jan. 9, 1968 to A. G. Carter describes an adjustable vehicle seat belt and seat belt combination that has a normally locked manually contoured positioning mechanism for the seat and a normally locked drum connected to the seat belt. There is communicating means interrelated between the seat belt adjusting mechanism and the seat belt drum member whereby release of the normally locked seat mechanism also releases the normally locked seat drum belt. This apparatus is quite useful in permitting the individual utilizing the belt portion to stretch the stored portion outwardly from the seat belt drum once the seat belt apparatus is separated, by a locking, from the other portions of the seat belt apparatus. However, this device, though sensibly self-adjusting as to the amount of belt tension exerted around the girth of a user, fails to provide an automatically releasable apparatus or an automatic opening apparatus upon impact which enables an injured person to escape with ease from the encircling and entrapping character of a closed belt system no matter how loose it is.

SUMMARY OF THE INVENTION

A primary object of the present invention is to provide a seat belt apparatus which automatically opens upon an impact to the vehicle carrying such belt device.

Another object of the present invention is to provide a belt apparatus which is automatically openable regardless of the weight of the user employing such belt.

Still another object of the present invention is to provide a seat belt apparatus which utilizes sensors external to the seat belt thereby enabling the seat belt to open due to impacts which the vehicle suffers in a variety of directions and to adjustable intensity.

Yet another object of the present invention is to provide a seat belt mechanism which may be manually opened as well as electrically operated providing respectively, for manual operation and automatic operation upon impact.

A further object of the present invention is to provide a seat belt apparatus which is responsive to impacts of varying magnitudes, such that the sensoring apparatus may be variably adjusted to respond to any desired level of impact so as to open the belt automatically.

Another object of the present invention is to provide a seat belt opening apparatus whose belt fastening means will remain open for an indefinite period of time after a predetermined period of time after the impact during which the seat belt remains closed.

Still another object of the present invention is to provide a seat belt which remains closed immediately following an impact so as to allow the vehicle to come to rest before the user is automatically released from the confining belt, thereby permitting such user to freely exit from the vehicle or to be assisted outwardly therefrom.

Heretofore, automatically releasable seat belts have been provided which permitted the seat belt locking portion to open when tensioning forces of sufficient magnitude, usually fixed in nature, were exerted upon seat belt components attached to the seat belt locking mechanism. Though this type of apparatus possessed the substantial advantage of the seat belts which were required to be opened and closed manually, they failed to provide an apparatus which comfortably and safely maintained a user in a safe condition during the time immediately following impact, such that sufficient time was afforded for the vehicle to come to rest before the belt automatically opened. Furthermore, such devices fail to be sensitive to impacts which were directed transverse to the length of the vehicle. Ordinarily, most of these devices required a substantial increase in applied forces on the two belt portions that are joined together by the seat belt fastening device, well above an estimated value of forces designed to maintain the seat belt closed upon impact. Here, two problems are encountered. Firstly, the automatic opening forces were most often sensitive only to forces in which the front of the vehicle or the rear of the vehicle was subjected to. Such forces tensioned the belt parts and if they were of sufficient magnitude would cause the belt locking components to open. Sideways directed forces did not at all involve opening the belt locking mechanism because the user rarely, if ever, was translated from a seated position to a position to his left or to his right with sufficient magnitude so as to create a force on the belt parts, causing them to open. Secondly, the amount of force exerted on the belt components was artificially selected by the manufacturer and though sometimes satisfactory, caused the belt to open on minor impacts, or worse yet, failed to allow the belt to open on impacts of sufficient magnitude to cause serious injury and yet not release the user from the restraining action of the closed belt.

The present invention recognizes these problems and provides a belt encircling device which may be opened upon impact applied to the vehicle in any direction and sensitive to impacts of varying magnitudes, totally controlled by the user by selecting any present level desired. Furthermore, such apparatus may be opened manually or automatically at the will of the user. Since the direction of impact is now unimportant and the magnitude of impact required to open the apparatus is selectable by the user, a totally safe apparatus is achieved. Finally, the present invention utilizes a timer to maintain the belt in a closed condition for a predetermined period of time following impact so as to permit the vehicle carrying the user to come to rest. As long as the impact originally experienced by the vehicle is of sufficient magnitude to operate the apparatus, the belt will then automatically open releasing the user from his restraining action.

These objects as well as other objects of the present invention, will become more readily apparent after reading the following description of the accompanying drawings.

DESCRIPTION OF THE PREFERRED EMBODIMENT

Figure 1:
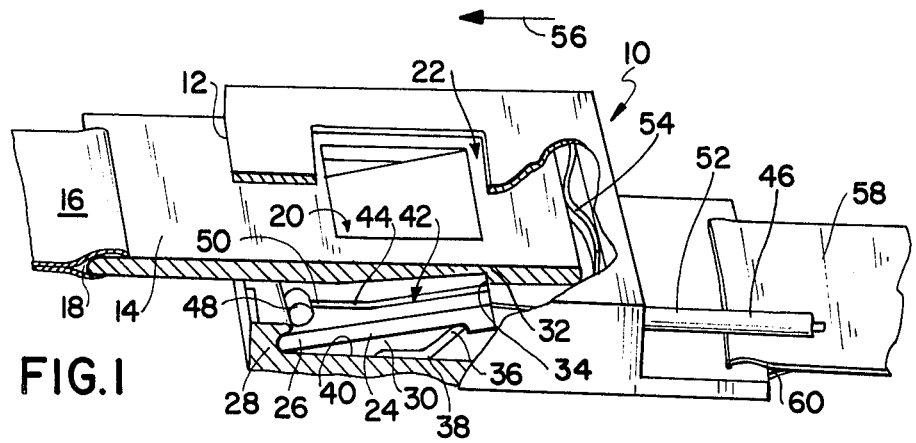
FIG. 1 is a prospective view of the present invention.

The structure and method of fabrication of the present invention is applicable to a seat belt apparatus for use on a moving vehicle having a pair of flexible belt portions, one end of each being secured to the vehicle and the other end of each being secured to portions of a seat belt fastening device. One of the components of the seat belt fastening device utilizes a plate or tongue-like device which is pivotably secured in a loop at the end of its flexible belt. The tongue or plate is provided with an opening passing transversely through its lateral surfaces. A housing is secured to the other belt portion utilizing a bight at the end thereof. The housing is provided with a cavity which has a slot opening and an opening disposed at right angles to the slot. The tongue is inserted into the slot of the housing such that its outermost lateral surface is disposed parallel to the surface of the housing containing the opening. Inside the cavity, at a location adjacent to the slot, a camming plate has one end thereof pivoted. The other end of the camming plate is maintained pivoted towards the lateral surface of the housing containing the opening, utilizing a flat leaf-like spring therefore. The edge of the camming plate disposed furthest from the slot is adapted to engage the edge of the opening in the tongue located adjacent the free end thereof. Thus, the camming plate, being maintained in an inclined position, engages the tongue in a locked condition. A wire-like spring is maintained secured in the cavity such that a portion thereof engages the free end of the tongue tending to force it outwardly from the slot. Naturally, when the camming plate is permitted to be disposed in the inclined position, the tongue may not be released and the belts are secured together.

If it is desired to release the tongue from the housing portion, the user may insert a finger through the opening in the housing, and through the opening in the tongue, so as to force downwardly the camming plate, releasing the camming edge thereof from the opening in the tongue, allowing the wire-like spring to move the tongue towards the slotted end of the housing, just enough to pass the camming edge of the camming plate. In this position, the tongue may be easily removed from the housing. If it is desired to automatically release the tongue from the housing, an external force is required to be applied to the camming plate. This force utilizes a flexible cable comprising an inner cable and a cable housing, such that the inner cable may be moved along the length of the cable housing by sliding there within. A cam rod is secured to the free end of the inner cable, being located within the cavity of the housing. A notch is disposed in the tongue having its open mouth portion extending into the camming edge of the tongue. This notch permits a portion of the inner cable, disposed adjacent to the end thereof carrying the cam rod, to pass there through. The inner cable then proceeds to pass outwardly from the housing by passing through a small opening therein, which also captures the free end of the cable housing. Thus, pulling the inner cable outwardly from the housing applies a force on the camming plate so as to cause the camming edge of the camming plate to disengage from the opening in the tongue. The tongue is then free to be removed from the housing in exactly the same fashion as when the camming plate is moved to an open position by a manual force applied thereto. The other end of the inner cable is attached to an electrically operated solenoid. The solenoid plunger is biased with a helically wound spring, in such a fashion, so as to maintain the inner cable in a position, relative to the outer cable, such that the end of the inner cable carrying the cam rod, is disposed away from the camming edge of the tongue and therefore does not release the tongue until such time that the solenoid coil is electrically energized. When the coil is electrically energized, the inner cable is moved away from the housing so as to cause the cam rod portion thereof to operate the camming plate into a tongue opening position.

A plurality of adjustable senses are hooked up in parallel so as to operate a timer. Each of the sensors are sensitive to impact. When an impact strikes the sensor, or the apparatus carrying the sensor, the sensor responds by closing its electrical contacts. Each sensor is devised so as to be adjustable in its response to impacts of varying magnitudes. This is accomplished in a manner well known to the art. For example, a sensor may be employed utilizing a housing to which is affixed a rod pivotably secured thereto and passing through an opening in the housing. The end of the rod that is pivoted relative to the housing, is contained within the cavity of the housing. A rubber-like grommet encircles the rod and is secured to the housing providing a centering force which tends to maintain the rod centered within the opening in the housing. The rod is insulated relative to the housing. A portion of the rod extending outwardly from the opening of the housing is provided with a weight secured thereto. The weight is slidable relative to the length of the portion of the rod. The weight may be secured at any selected location along the length of the rod extending outwardly the housing. Thus, when the weight is disposed close to the housing, an impact of great magnitude is required to overcome the resilient centering forces exerted by the rubber grommet on the rod. When such forces are experienced, the rod pivots towards the rim of the opening, causing the rod to electrically contact the housing and electrically short therewith. A wire coupled to the rod, and the wire coupled to the housing, each contact each other electrically when the impact is of sufficient magnitude. When the weight is moved upwardly along the length of the rod and outwardly from the housing, an impact of minor magnitude will cause the rod to electrically contact the housing. Thus, such an apparatus is made to respond to impacts of varying magnitude.

Each of the above described sensors are disposed in the series electrical circuit and coupled to a timer which automatically latches up in response to a short circuit experienced at its terminals. Such timers, well known in the art, remain latched up and commence timing immediately upon being latched up. At the end of a predetermined timing period, such timers produce an electrical signal, providing an outward voltage which is equivalent in magnitude to the source of voltage utilized to operate the timer. The motor vehicle battery may be utilized to operate the timer and to provide the timed output signal. Such signal is then applied to the terminals of a solenoid coil. Such coil is provided with a plunger possessing magnetic properties which is disposed within the coil. A helical spring is utilized so as to have one end thereof dispose contacting the plunger and the other end thereof dispose contacting the frame of the solenoid coil so as to tend to bias the plunger outwardly from within the coil center.

A flexible cable is provided which is capable of having the inner cable portion thereof slide relatively to the sheath portion thereof. One end of the cable is utilized in conjunction with the solenoid coil. Its inner cable is attached to the solenoid plunger and has its sheath portion attached to the frame of the solenoid coil. The other end of the flexible cable has its inner cable attached to the cam rod while its sheath is attached to the housing. Any one of the sensors, upon being operated into a momentary closed circuited condition, causes the timer to latch up. Such sensors may be more sensitive to impact in one direction than another direction. Thus, a pair of sensors, each being sensitive to impacts directed at right angles to one and other, may be minimally employed so as to release the tongue portion from the housing upon the motor vehicle experiencing an impact either directed from front to back or back to front, or, from left to right or right to left, related to the direction of travel of the motor vehicle. A timer may be employed whose fixed time interval, may be manually adjusted at the will of the user, if desired.

Now referring to the figures, and more particularly to the embodiment illustrated in FIG. 1 showing housing 10 having a slot 12 in which tongue 14 is installed. Belt 16 is secured to tongue 14 utilizing bight 18 therefore. Tongue 14 is provided with opening 20 shown disposed adjacent to opening 22 in housing 10. Camming plate 24 is shown having end 26 thereof pivotably engaged within notch 28 within cavity portion 30 of housing 10. Camming edge 32, of tongue 14 is shown engaged with edge 34 of camming plate 24. Flat leaf spring 36 is shown having end 38 thereof engaged with floor 40 of cavity 30. The other end of flat spring 36 is shown engaged with camming plate 24 so as to maintain camming 24 in an inclined position, as shown. Notch 42 is disposed within camming plate 24 for which the inner cable 44 of flexible cable 46 passes. Camming rod 48 is attached to end 50 of inner cable 44. Sheath 52 is shown attached to the housing. Wire-like spring 54 is secured within cavity 30 and applies a force in the direction of arrow 56 to tongue 14. Belt portion 58, utilizes bite 60, to secure belt portion 58 to housing 10.

Figure 2:
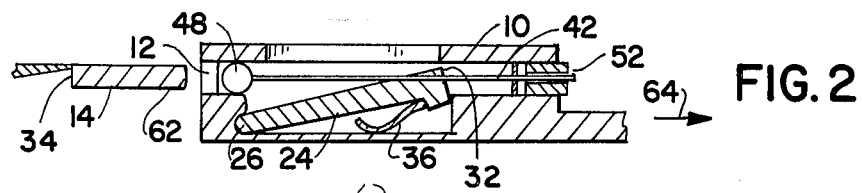
FIG. 2 is a side elevation cross section view of the present invention.

FIG. 2 illustrates a cross sectional view of the apparatus shown in FIG. 1 wherein free end 62 of tongue 14 is shown displaced outwardly from housing 10, before or after tongue 14 is inserted into the housing. Cam rod 48 is shown adjacent to slot 12 in this position. When tongue 14 is inserted in slot 12, cam rod 48 is pushed slightly in the direction of arrow 64 and thence downwardly toward end 26 of camming plate 24.

Figure 3:
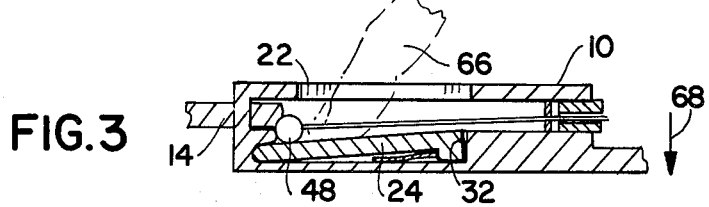
FIG. 3 is a side elevation cross sectional view of the present invention shown in a manually released position.

FIG. 3 illustrates finger 66 being inserted into opening 20 so as to cause camming plate 24 to have camming edge 32 thereof forced downwardly in the direction of arrow 68.

Figure 4:
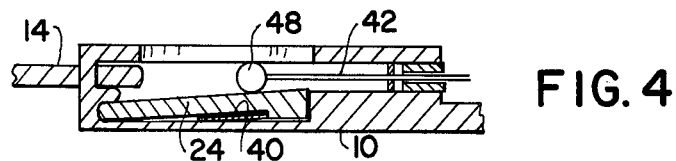
FIG. 4 is a side elevation cross sectional view of the present invention shown being released automatically.

FIG. 4 illustrates cam rod 48 displaced in the direction of arrow 64, shown in FIG. 2, when a force, applied in the direction of arrow 64, shown in FIG. 2, to cable 42. Here, camming plate 24 is depressed towards floor 40 allowing tongue 14 to move in the direction of arrow 56, shown in FIG. 1.

Figure 5:
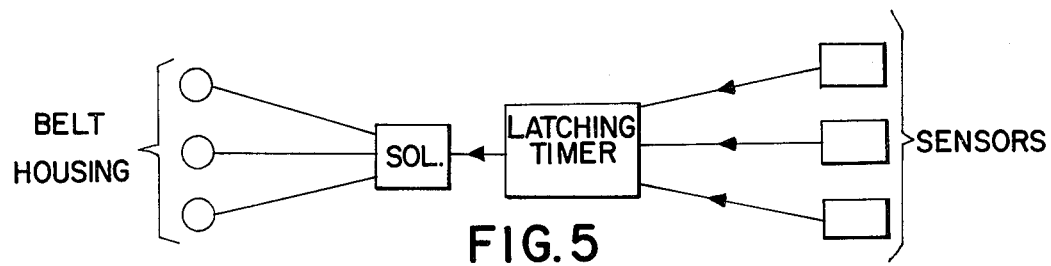
FIG. 5 is a block diagram of the electrical components in the present invention.

FIG. 5 illustrates plurality of sensors each electrically coupled to a latching timer. The latching timer when latched up by the electrical operation of the sensors causes the solenoid to operate. Such solenoid is hooked up to one of a plurality of belt housings, shown in FIGS. 1–4. Thus, any sensor causes the timer to start its timing cycle, at the conclusion of which the solenoid is caused to electrically energize. This solenoid operates each of the inner cables 44, typically shown in FIG. 1, so as to operate the housing mechanism therein to disengage automatically the tongue portion upon the occurrence of an impact capable of operating the sensor. The convenient source of electrical energy, such as the vehicle battery, not shown, operates the sensors and the timer and the solenoid coil.

Figure 6:
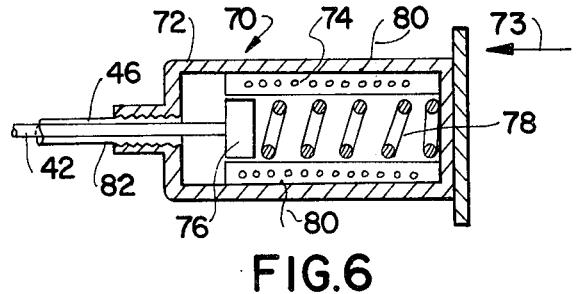
FIG. 6 is a side elevation cross sectional view of the solenoid coil operating portion of the present invention.

FIG. 6 illustrates solenoid 70 comprising a housing 72 which has an electrical coil 74 disposed there within.

Plunger 76 operates within the solenoid coil. Helical spring 78 is disposed within solenoid coil 74 and applies a bias force in the direction of arrow 73. When electrical energy is aplied to wires 80 the solenoid coil is energized causing plunger 76 to move in the direction opposite to arrow 73 which permits inner cable 44 to move in the direction opposite to arrow 73. Sheath 46 is shown having end 82 thereof secured to housing 72.

Figure 7:
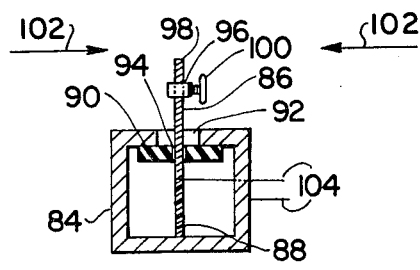
FIG. 7 is a block diagrammatic view of a portion of the electrical components of the present invention.

FIG. 7 illustrates a sensor, typical of the sensors depicted in FIG. 5. Housing 84 is shown electrically insulated from rod 86 utilizing lower attached insulating rod 88 therefore. Rubber-like grommet 90 is secured within opening 92 of housing 84. Rod 86 passes through hole 94 in grommet 90 providing a centering force on rod 86. Weight 96 is shown slidably engaged along portion 98 of rod 86, shown outwardly from opening 92, of housing 84. Set screw 100 is utilized to position weight 96 at any preferred location along the length of portion 98. When weight 96 is positioned towards the free end of portion 98 a lesser amount of force, applied in directions of arrows 102 is required to cause rod 86 to contact the marginal edges of opening 92. Ultimately, a greater amount of force is required to cause such contact when weight 96 is displaced towards opening 92 and locked in position thereat by set screw 100. Thus, the sensor depicted herein will remain open circuited so far as wires 104 are concerned when the impact suffered by weight 96 is insufficient to cause rod 86 to engage the marginal edges of housing 84 at the location of opening 92. Wires 104 are coupled to the timer illustrated in FIG. 5. Other equivalent sensoring devices are coupled to such timer, as shown in FIG. 5.

One of the advantages of the present invention is a seat belt apparatus which automatically opens upon an impact to the vehicle carrying such belt device.

Another advantage of the present invention is a belt apparatus which is automatically openable regardless of the weight of the user employing such belt.

Still another advantage of the present invention is a seat belt apparatus which utilizes sensors external to the seat belt thereby enabling the seat belt to open due to impacts which the vehicle suffers in a variety of directions and to adjustable intensity.

Yet another advantage of the present invention is a seat belt mechanism which may be manually opened as well as electrically operated providing respectively, for manual operation and automatic operation upon impact.

A further advantage of the present invention is a seat belt apparatus which is responsive to impacts of varying magnitudes, such that the sensoring apparatus may be variably adjusted to respond to any desired level of impact so as to open the belt automatically.

Another advantage of the present invention is a seat belt opening apparatus whose belt fastening means will remain open for an indefinite period of time after a predetermined period of time after the impact during which the seat belt remains closed.

Still another advantage of the present invention is a seat belt which remains closed immediately following an impact so as to allow the vehicle to come to rest before the user is automatically released from the confining belt, thereby permitting such user to freely exit from the vehicle or to be assisted outwardly therefrom.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. An automatic releasing seat belt comprising a pair of belts, one end of one of said pair of belts secured to a tongue-like plate, one end of the other of said pair of belts secured to a housing, means to manually releasably secure said tongue-like plate to said housing, said means to manually releasably secure includes said housing having a cavity, said housing having a slot, said slot communicating with the exterior of said housing and said cavity, said housing having an opening, said opening being disposed adjacent said slot, a camming plate, said camming plate being disposed within said cavity, one end of said camming plate being pivotably engaged within said cavity, said tongue-like plate having an opening, said opening in said tongue-like plate being disposed adjacent said opening in said housing when said tongue-like plate is disposed passing through said slot, the other end of said camming plate being disposed in touching engagement with a portion of the marginal edges of said opening in said tongue-like plate, a spring, said spring urging said other end of said camming plate in said touching engagement, whereby the application of manually applied force to said camming plate causes said other end thereof to be disengaged from said portion of said marginal edges of said opening of said tongue-like plate releasing said tongue-like plate from said housing, means to release said tongue-like plate from engagement with said housing upon the occurrence of an impact on a sensor, said means to release said tongue-like plate includes a flexible cable, said flexible cable having an inner cable and a sheath, said inner cable slidably engaged within said sheath, a rod, said rod fixedly secured to one end of said inner cable, said rod being disposed within said cavity, said housing having another opening, a portion of said inner cable adjacent said one end thereof disposed passing through said another opening, one end of said sheath adjacent said one end of said inner cable disposed fixedly secured to said another opening, a solenoid, said solenoid having a plunger therein, the other end of said inner cable fixedly secured to said plunger, said solenoid having a housing, the other end of said sheath fixedly secured to said housing of said solenoid, a helical spring, said helical spring urging said plunger outwardly from said solenoid, whereby energizing said solenoid causes said plunger to be urged away from said other end of said sheath and whereby said rod is displaced slidably along a lateral surface of said camming plate causing said other end of said camming plate to be disengaged from said portion of said marginal edges of said opening in said tongue-like plate, means to variably adjust the sensitivity of said sensor responsive to said impact, a timer, means to operate said timer upon said impact, whereby said timer delays said release from engagement of said tongue-like plate to said housing a period of time after the occurrence of said impact.

2. The apparatus as claimed in claim 1 comprising a plurality of said sensors being coupled to said timer.

3. The apparatus as claimed in claim 1 further comprises a wire-like spring, one end of said wire-like spring being disposed in touching engagement with said housing, the other end of said wire-like spring being disposed in touching engagement with said tongue-like plate when said tongue-like plate is secured within said housing, whereby said wire-like spring biases said tongue-like plate in a direction whereby said opening in said tongue-like plate is urged towards said slot of said housing.

4. The apparatus as claimed in claim 1 wherein said sensor comprises a sensor housing, a sensor rod, one end of said sensor rod pivotably secured within said housing, means to electrically insulate said sensor rod from said sensor housing, said sensor housing having an opening therein, the other end of said sensor rod passing through said opening in said sensor housing, a weight, means to slidably affix said weight to said sensor rod along a portion thereof extending outwardly from said sensor housing, means to resiliently position said sensor rod intermediate the marginal edges defining said opening in said sensor housing.

* * * * *